US007766573B1

(12) United States Patent
Wolf et al.

(10) Patent No.: US 7,766,573 B1
(45) Date of Patent: Aug. 3, 2010

(54) QUICK RELEASE FASTENER FOR HURRICANE SHUTTERS

(76) Inventors: Edward A. Wolf, 7963 NW. 70th Ave., Parkland, FL (US) 33067; Mark Clark, 19076 Eagles Way Ct., Loxahatchee, FL (US) 33470

( * ) Notice: Subject to any disclaimer, the term of this patent is extended or adjusted under 35 U.S.C. 154(b) by 957 days.

(21) Appl. No.: 11/551,506

(22) Filed: Oct. 20, 2006

Related U.S. Application Data

(63) Continuation-in-part of application No. 10/908,999, filed on Jun. 3, 2005, now Pat. No. 7,565,776.

(51) Int. Cl.
*F16B 21/09* (2006.01)

(52) U.S. Cl. ....................... 403/325; 403/327; 403/328; 403/330; 52/202; 52/203; 411/511; 411/512; 49/463; 49/465; 292/301

(58) Field of Classification Search ................. 403/325, 403/328, 330, 326; 411/511, 512, 437, 433; 52/202, 203; 49/463, 465, 41, 50; 292/155, 292/301
See application file for complete search history.

(56) References Cited

U.S. PATENT DOCUMENTS

| | | | | |
|---|---|---|---|---|
| 4,906,123 | A * | 3/1990 | Weskamp et al. | 403/322.2 |
| 5,332,347 | A * | 7/1994 | Kimisawa | 411/182 |
| 6,331,091 | B2 * | 12/2001 | Cross | 403/322.2 |
| 6,532,702 | B1 * | 3/2003 | Scribner | 52/202 |
| 6,878,024 | B1 * | 4/2005 | Kohuth | 441/10 |
| 7,435,148 | B2 * | 10/2008 | Clark | 441/10 |
| 2007/0292205 | A1 * | 12/2007 | Duval | 403/325 |

* cited by examiner

*Primary Examiner*—Brian E Glessner
*Assistant Examiner*—James J Buckle, Jr.
(74) *Attorney, Agent, or Firm*—Malin Haley DiMaggio Bowen & Lhota, P.A.

(57) ABSTRACT

A quick release fastener mechanism for easy installation and removal of conventional hurricane storm shutters over and from a window or door of a structure. The device comprises a removable stud for engaging and securing the hurricane shutters and a spring-actuated panel fastener that includes a leaf spring and hinged locking element to engage and hold the removable stud in position. The quick release fastener is installed and removed from outside the building by actuating or depressing a lever end of the hinged locking element to lock or to unlock and release the removable stud from within the spring-actuated panel fastener.

7 Claims, 17 Drawing Sheets

QUICK RELEASE FASTENER FOR HURRICANE SHUTTERS

BACKGROUND OF THE INVENTION

1. Field of the Invention

This invention relates to a quick release fastener device for both securely installing and quickly removing storm shutter panels over and from windows and doors of a home or building.

2. Description of Related Art

In the southeastern United States as well as other areas of the world prone to receiving tropical storms, hurricane or storm shutters are a virtual necessity for homes and businesses in coastal areas. While providing protection from high winds and flying debris during the onslaught of a hurricane or tropical storm, conventional hurricane shutters are difficult to install and require time-consuming and tedious installation and use of wing nuts and other inefficient fastening devices to securely install the shutters over windows and doors of buildings. The storm shutters also represent an inherent danger to those who take shelter behind them due to the occurrence of emergency situations, such as fires, wherein people are frequently trapped inside their homes and cut off from normally available escape routes through the windows and doors due to the manner in which conventional shutters are fastened securely to a building. Currently, many hurricane shutters are firmly attached to the exterior of a building by a plurality of threaded fasteners. Each fastener must be individually and manually removed from the outside of the house by unscrewing or otherwise unfastening the shutters from the exterior walls requiring a large amount of time and effort. For this reason, conventional hurricane shutters are inefficient and also impose a great risk to life. Numerous incidents are reported of persons succumbing to smoke and fire because they were unable to exit their homes due to being trapped behind the shutters covering the windows and doors. With most hurricane shutters, inhabitants cannot access the exterior fasteners from the interior of the house, while a rescuer, such as a fireman, outside the shuttered building must remove numerous threaded fasteners to remove a few shutter panels to expose the windows and provide a point of entry into the building.

SUMMARY OF THE INVENTION

This device is a quick release shutter fastener that secures hurricane shutter panels firmly in place while also allowing manual quick and easy removal of the hurricane storm shutters and panels. The device may also be used with a hurricane shutter escape mechanism to provide an escape route to a structure's occupants as well as access by a rescuer attempting to enter the building through a window or door covered by hurricane storm shutter panels during an emergency.

In the preferred embodiment, the quick release fastener device comprises a panel fastener body, a hinged locking element, a leaf spring, and a removable stud for securing storm shutter panels over windows and doors. The spring-actuated panel fastener body is constructed preferably from a high impact durable material and attaches directly to the stud that passes through the holes in the shutter/panels, thereby holding the panels in place. A metal leaf spring exerts tension force on a hinged locking element installed within the panel fastener body to align grooves of both the locking element and central protrusion of the fastener body which securely retain the removable stud within the channel created by said grooves and within the central aperture of the panel fastener body. A lever of the hinged locking element is actuated to bring the locking element and central protrusion into an open configuration to permit insertion or removal of the removable stud from the panel fastener body. To remove the spring-actuated panel fastener, the user must actuate or press the lever upward to move the leaf spring in the direction that reduces the spring's angle and increases the distance between the surfaces of the central protrusion and locking element grooves which removes the mechanical interference and allows the panel fastener to be pulled off the removable stud quickly and easily by manual manipulation. The spring-actuated panel fastener is installed on the outside to secure the shutters/panels to the structure and allows the quick release and removal of the shutters/panels from the outside when manually activated. Thus, a number of quick release fasteners are needed to install storm shutters on the home/building. To remove the storm shutter panel from the opening in the building, the user must manually remove the spring-actuated panel fasteners from a plurality of studs, which permits the storm shutter panel to be uninstalled by sliding the shutter panel off of the removable studs.

An object of this invention is to provide an easily-used, inexpensive, and reliable shutter release for quickly installing and removing conventional temporarily-installed hurricane storm shutters or panels or plywood coverings from their engagement with a structure.

Another object of this invention is to provide a quick release fastener that can be used by itself for installing storm shutter panels or can be used in conjunction with a hurricane shutter escape mechanism to allow emergency personnel and others to quickly and easily access a home or building during an emergency, such as a fire, when the windows, doors and other covered openings of a home or building are secured by conventional hurricane storm shutters and panels, or plywood coverings.

Still another object of this invention is to provide a quick release mechanism for conventional hurricane storm shutters/panels or typical plywood coverings that can easily convert existing conventional storm shutter/panel mounting hardware over to the previously described hurricane shutter escape mechanisms without modification of the home/building.

Yet another object of this invention is to make the typical hurricane storm shutter/panel or typical plywood covering installation and removal process quicker and easier by eliminating the hassle of installing and removing numerous pieces of hardware, such as wingnuts, that are prone to jamming and/or breaking on each shutter/panel or typical plywood coverings, and use the previously described quick release spring actuated panel fasteners instead.

In accordance with these and other objects which will become apparent hereinafter, the instant invention will now be described with particular reference to the accompanying drawings.

DETAILED DESCRIPTION

This application is a continuation-in-part of and incorporates by reference U.S. Pat. No. 7,565,776. The hurricane shutter quick release fastener device 10' comprises a spring-actuated panel fastener 20' and removable stud 18' for installing and securing storm shutters over windows, doors, and other openings of homes and buildings. The device 10' is preferably used as a stand-alone shutter fastening device but may also be used as a fastener in connection with other hurricane or storm shutter installation devices. For example, the device 10' may also be used as a fastener with the hurricane shutter escape mechanism 10, illustrated in FIGS. 1A-7, in place of the fastener 20 shown in FIGS. 3A-3F, 4B, 5, and 7.

Figure 8:
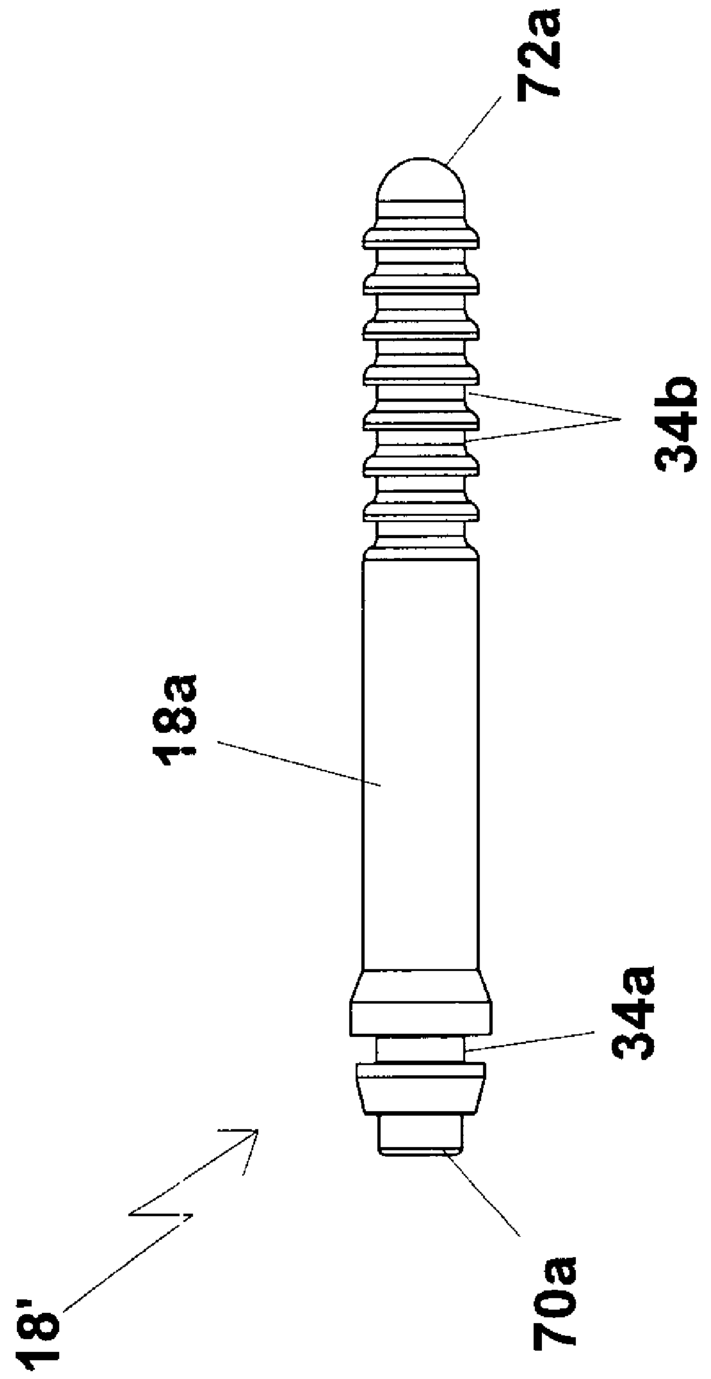
FIG. 8 shows a side elevational view of the removable stud.
Figure 9F:
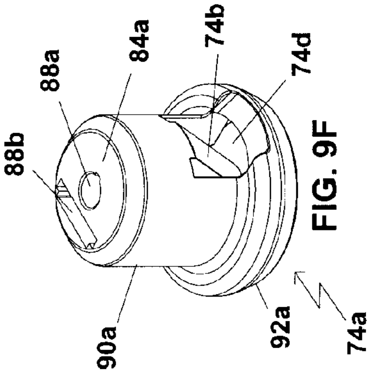
FIG. 9F shows an inverted right perspective view of the panel fastener body.
Figure 9B:
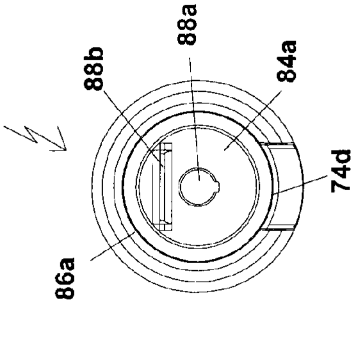
FIG. 9B shows a bottom plan view of the panel fastener body.
Figure 9G:
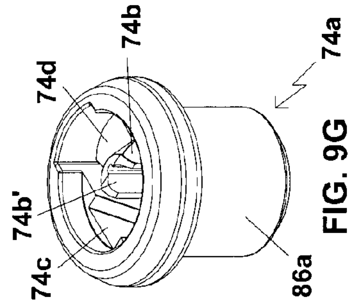
FIG. 9G shows a left rear perspective view of the panel fastener body.
Figure 9C:
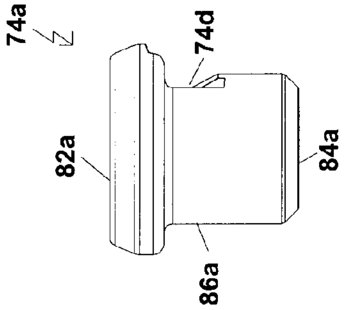
FIG. 9C shows a left side elevational view of the panel fastener body.
Figure 9E:
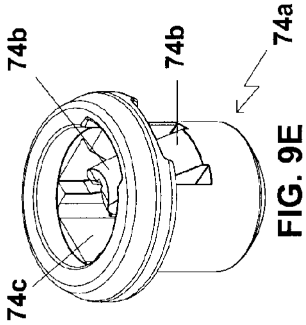
FIG. 9E shows a left front perspective view of the panel fastener body.
Figure 9D:
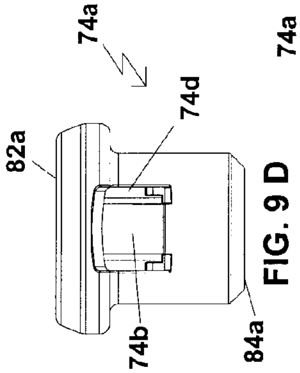
FIG. 9D shows a front side elevational view of the panel fastener body.
Figure 9A:
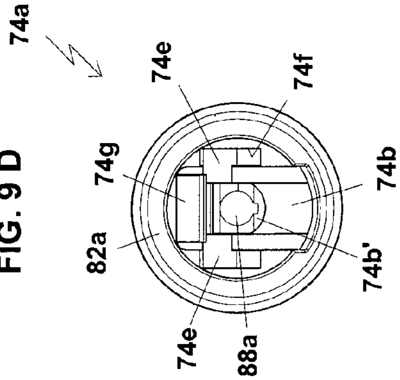
FIG. 9A shows a top plan view of the preferred panel fastener body.

FIGS. 8, 9A-9G, 10A-10C, 11A-11F, 12A-12H, 13A-13D, and 14 illustrate the preferred embodiments of the removable stud 18' and spring-actuated panel fastener 20' and its associated parts. As shown in FIG. 8, the removable stud 18' of said device 10' comprises a metal dowel 18' having a cylindrical outer wall 18*a*, a first end 70*a*, a rounded second end 72*a*, and a series of annular grooves 34*b* adjacent to said second end 72*a* for engaging the fastener 20'. As illustrated in FIG. 8, the removable stud 18' may also include an annular groove 34*a* adjacent to said first end 70*a* for engaging a stud-releasing slot 32 of a release member 14 of the hurricane shutter escape mechanism 10. A number of alternate embodiments of the device eliminate the annular groove 34*a* in favor of other anchoring means. The first end 70*a* of the removable stud 18' is preferably removably connectable to a building, however, said stud may also be permanently attached to the building. In one alternate embodiment, the removable stud 18' includes a bolt head (not shown in the drawings) on the first end 70*a* for inserting into and becoming secured by an F-channel (also not shown in the drawings) installed on the outside wall of a building for installation of hurricane shutters. The removable stud 18' may also be permanently connected to a structure in locations on the surface of the structure, such as window sills, that are appropriate for installation of storm shutters. In other alternate embodiments, the annular groove 34*a* on the first end 70*a* of the removable stud 18' may be replaced by conventional anchoring means features (not shown in the drawings) incorporated as part of said stud such as a self tapping screw, bolt head used for sliding into a channel, threaded or screw end, a sidewalk bolt, a truss bolt, or any other suitable anchoring means that is capable of securely anchoring said stud directly or indirectly to the structure.

Figure 14:
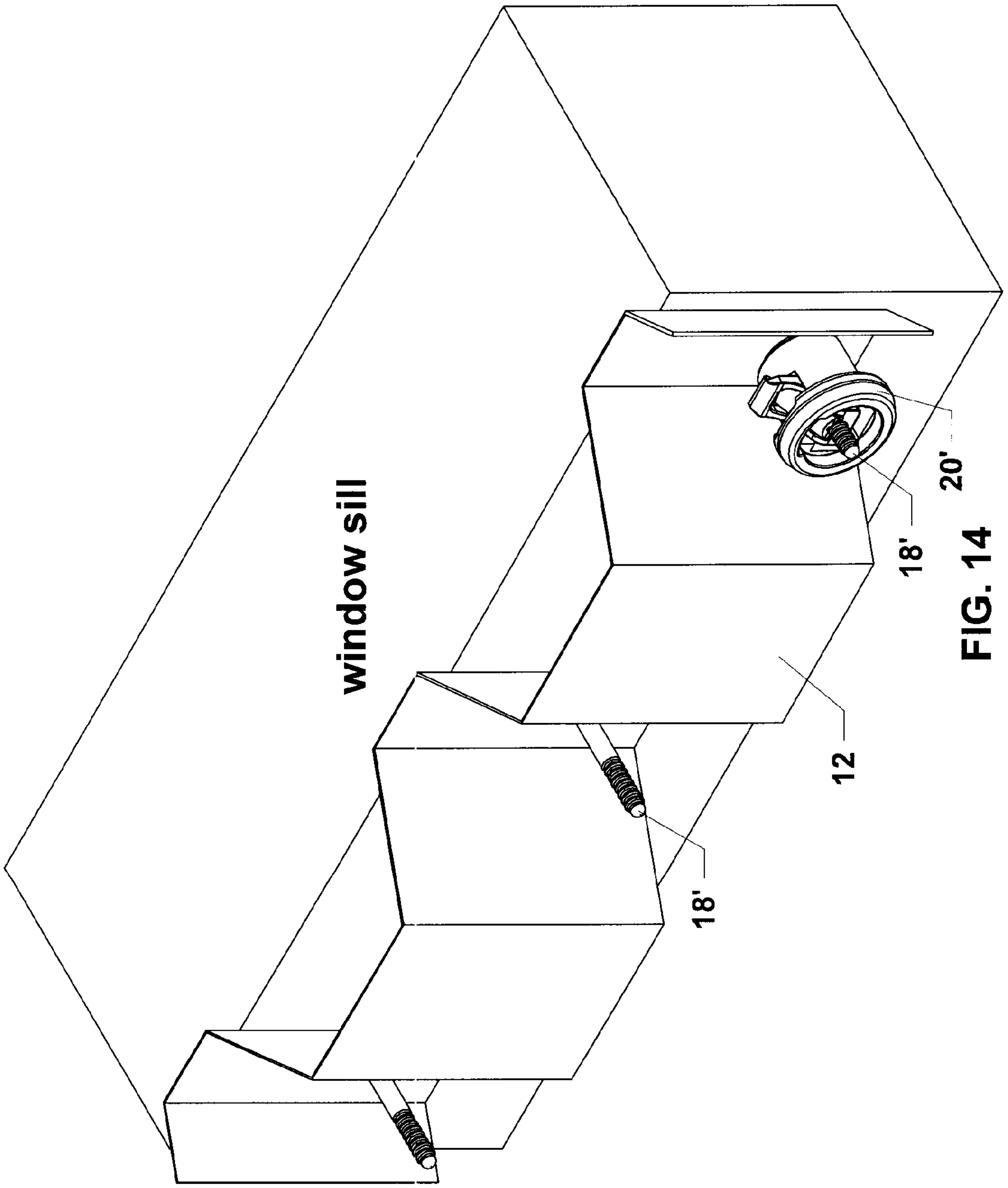
FIG. 14 shows a partial perspective view of the fastener and removable stud in use to secure a hurricane storm shutter panel to a window sill for installation over a window.

The preferred spring-actuated panel fastener 20', illustrated in FIGS. 9A-9G, 10A-10C, and 11A-11F, comprises a panel fastener body 74*a*, a manually-releasable leaf spring 76*a*, and a hinged locking element 128 for actuating said leaf spring to release the stud 18' from said panel fastener body. As shown in FIG. 14, said spring-actuated panel fastener 20' serves to engage the removable stud 18' at a surface of the hurricane shutter 12 so that said shutter is mounted firmly in position over an opening in a structure. As illustrated in FIGS. 12A-12H, the hinged locking element 128 is a generally L-shaped, single-piece unit and comprises a horizontal bifurcated base 128*a*, a vertical engagement section 128*b*, and one or more fulcrum components 128*c*. The bifurcated base 128*a* and the lever end 128*a'* of said bifurcated base define an aperture 128*e*. The base 128*a* includes a lever end 128*a'* and a connected end 128*a''* that is solidly and perpendicularly attached to the vertical engagement section 128*b* which extends upward from the base 128*a*. The vertical engagement section 128*b* is solidly connected to the base 128*a* at the fulcrum pivot point 128*c*. Said vertical engagement section 128*b* further comprises a retaining acclivity 128*b'* on a rear side 128*b''* of said engagement section and a groove 128*d* on a front side 128*d''* of said engagement section. The groove 128*d* of said hinged locking element 128, shown in FIGS. 10B, 12A, and 12B, includes a series of ridges 128*d'* (shown in FIGS. 12C and 12F) that are sized and spaced to correspondingly fit into and engage the series of annular grooves 34*b* of the removable stud 18' to lock and retain said stud in position within the panel fastener body 74*a*. Said groove 128*d* is opposite and corresponding in position and identical in size to the groove 74*b'* of said central protrusion 74*b*. The hinged locking element 128 is connected to the panel fastener body 74*a* and securely engages the removable stud 18*b'* within said groove 128*d* of the locking element when said fastener is not actuated.

Preferably, the fulcrum components 128*c* are cylindrical in shape for easy rotation of the hinged locking element 128 during manual actuation of the lever end 128*a'* of said locking element.

As shown in FIGS. 9A-9G, 10A-10C and 11A-11F, the panel fastener body 74*a* of said spring-actuated panel fastener 20' includes a planar first face 82*a*, a planar second face 84*a*, a cylindrical outer wall 86*a*, a central aperture 88*a* for receiving the removable stud 18', a slot-shaped aperture 88*b* for receiving the leaf spring 76*a*, and a central protrusion 74*b* for engaging the hinged locking element 128. The central aperture 88*a* extends entirely through the said panel fastener body 74*a* with openings on both the first face 82*a* and the second face 84*a* of the panel fastener body. The slot-shaped aperture 88*b* extends longitudinally through the planar second face 84*a* and into the central recess 74*c* of said panel fastener body 74*a* for receiving the leaf spring 76*a*. The central protrusion 74*b* includes a groove 74*b'* that is coaxial and colinear with the central aperture 88*a*, said central protrusion being connected to and extending upward from a planar bottom surface 74*g* of the central recess 74*c*. Said panel fastener body 74*a* further comprises a cylindrical base portion 90*a* that includes said second face 84*a* and said outer cylindrical wall 86*a*. Said panel fastener body 74*a* also includes a cylindrical top portion 92*a* that has a greater diameter than said cylindrical base 90*a* and that includes said first face 82*a*.

The panel fastener body 74*a* further includes a central recess 74*c*, a side aperture 74*d* passing through the cylindrical outer wall 86*a* of the panel fastener body 74*a*, and an engaging means 74*e* for securely holding the hinged locking element 128 in position within said central recess. The central recess 74*c* passes through said planar first face 82*a* and extends longitudinally downward into said panel fastener body 74*a*. The cavity formed by said central recess 74*c* is defined by one or more inner walls 74*f* and the planar bottom surface 74*g* of the panel fastener body 74*a*. The side aperture 74*d* opens into said central recess 74*c* and receives the inserted hinged locking element 128 that is installed within the central recess of the panel fastener body 74*a*.

Figure 11A:
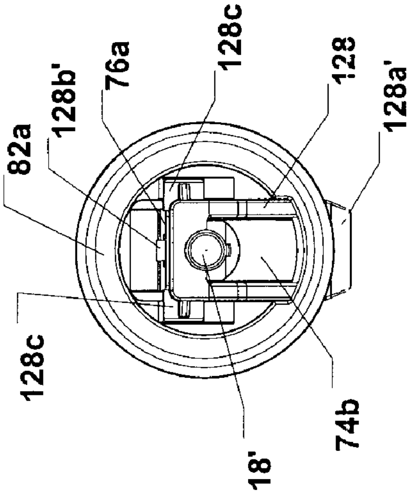
FIG. 11A shows a top plan view of the fastener in the closed and locked configuration with a removable stud securely engaged in the central aperture and between the grooves of the central protrusion and hinged locking element.
Figure 11B:
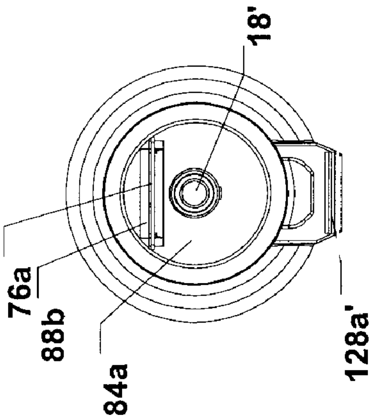
FIG. 11B shows a bottom plan view of the fastener with a removable stud inserted within the central aperture.
Figure 11C:
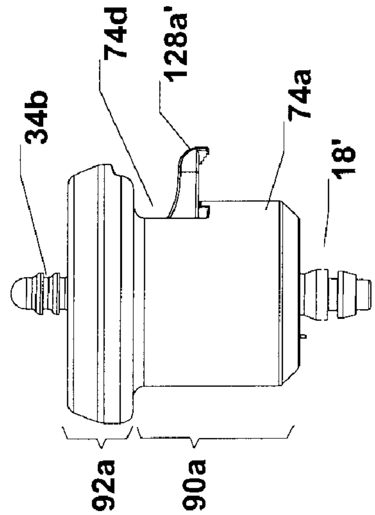
FIG. 11C shows a left side elevational view of the fastener in the closed and locked configuration with a removable stud securely engaged in the central aperture and between the grooves of the central protrusion and hinged locking element.
Figure 11D:
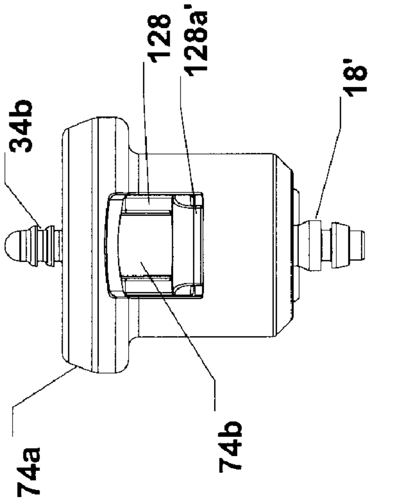
FIG. 11D shows a front elevational view of the fastener in the closed and locked configuration with a removable stud securely engaged in the central aperture and between the grooves of the central protrusion and hinged locking element.
Figure 11E:
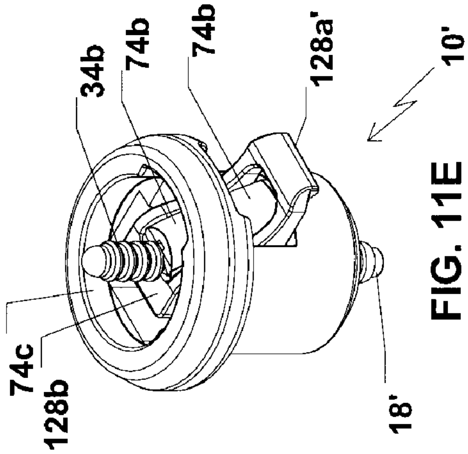
FIG. 11E shows a left perspective view of the fastener in the closed and locked configuration with a removable stud securely engaged in the central aperture and between the grooves of the central protrusion and hinged locking element.
Figure 11F:
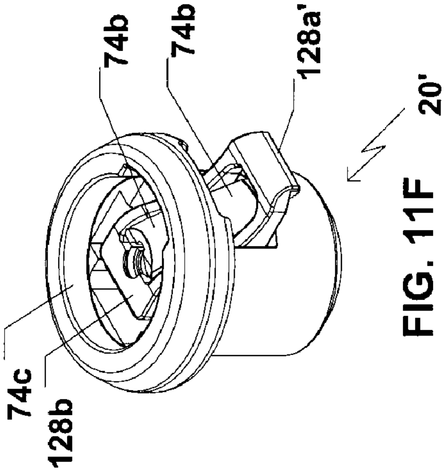
FIG. 11F shows a left perspective view of the spring-actuated panel fastener without the removable stud inserted.
Figure 12B:
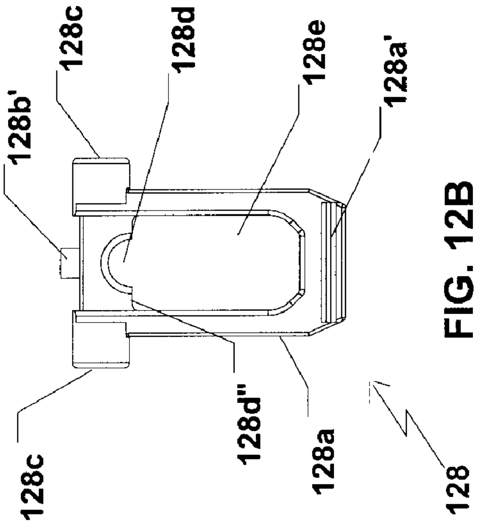
FIG. 12B shows a bottom plan view of the hinged locking element.
Figure 12D:
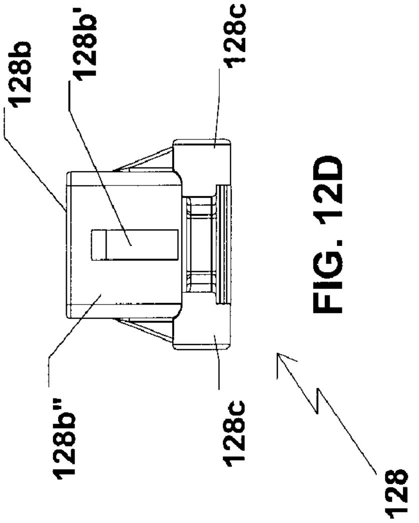
FIG. 12D shows a rear elevational view of the hinged locking element.
Figure 12A:
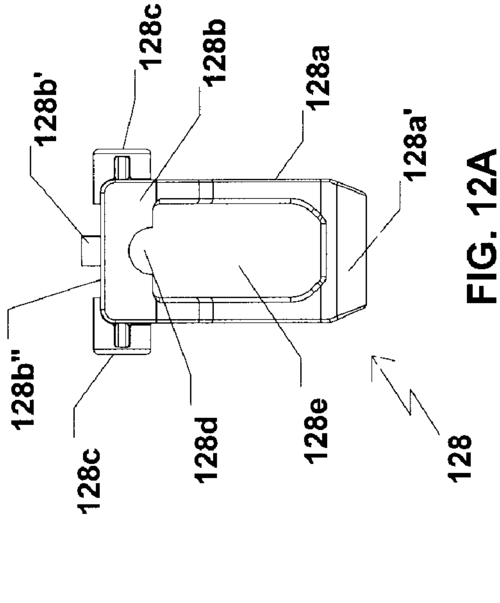
FIG. 12A shows a top plan view of the hinged locking element.
Figure 12C:
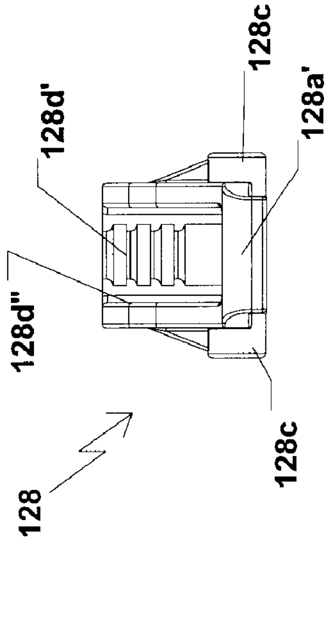
FIG. 12C shows front elevational view of the hinged locking element.
Figure 12E:
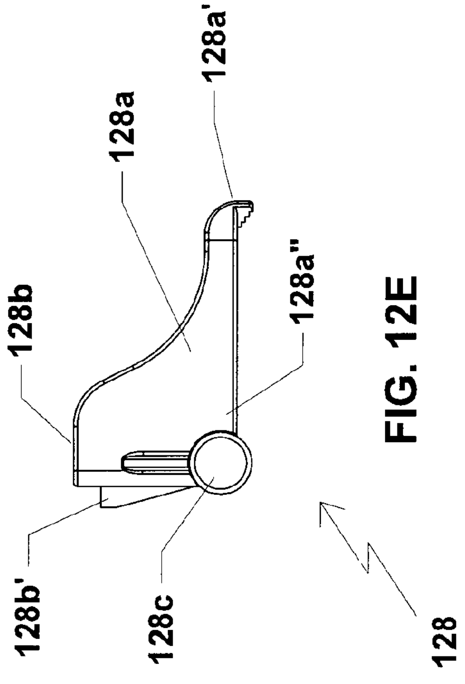
FIG. 12E shows a left side elevational view of the hinged locking element.
Figure 12F:
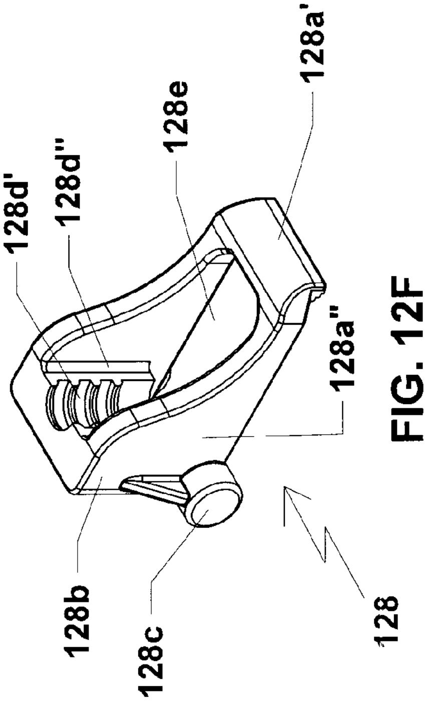
FIG. 12F shows left front perspective view of the hinged locking element.
Figure 12G:
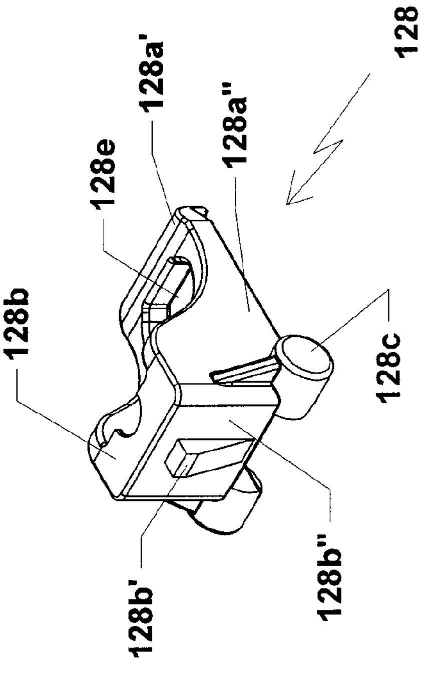
FIG. 12G shows left rear perspective view of the hinged locking element.
Figure 12H:
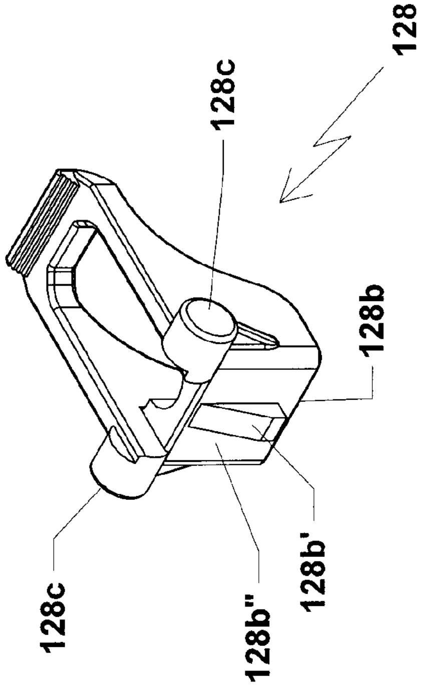
FIG. 12H shows an inverted right perspective view of the hinged locking element.
Figure 13D:
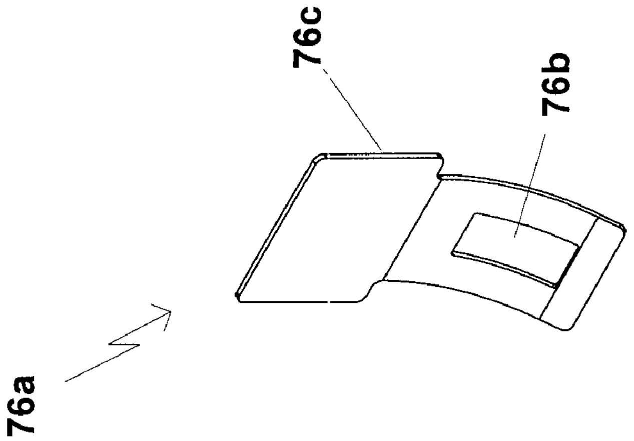
FIG. 13D shows a perspective view of the leaf spring.
Figure 13A:
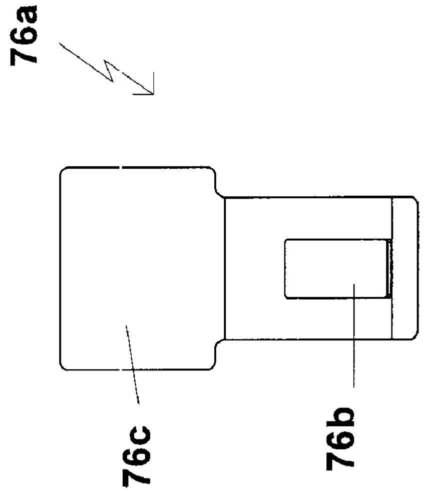
FIG. 13A shows a top plan view of the leaf spring.
Figure 13B:
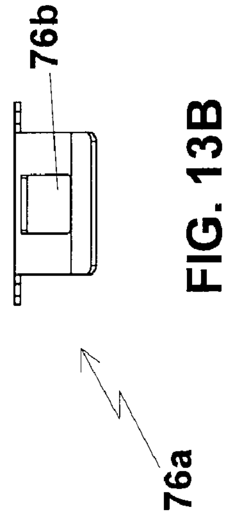
FIG. 13B shows a front elevational view of the leaf spring.
Figure 13C:
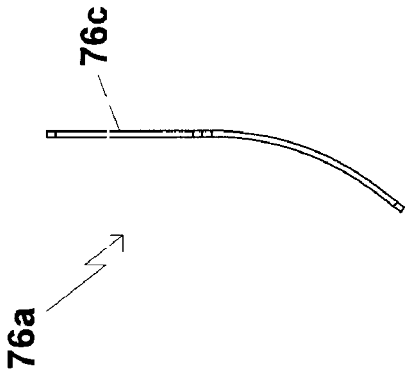
FIG. 13C shows a side elevational view of the leaf spring.

The engaging means 74*e* comprises one or more parallel circular or cylindrical recesses 74*e* sized and shaped to fit and receive insertion of the fulcrum components 128*c* which rotate within said recesses 74*e* during manual actuation of the lever end 128*a'* of the hinged locking element 128. Said fulcrum components 128*c* are rotatable within said recesses 74*e* to allow pivoting of the lever 128*a'* and of the vertical engaging section 128*b* that includes the groove 128*d* of said locking element 128. The aperture 128*e* of the locking element 128 receives insertion of the central protrusion 74*b* so that the groove 128*d* of said locking element and the groove 74*b'* are aligned with each other and vertically with the central aperture 88*a*, thereby effectively extending the length of said central aperture. The central aperture 88*a* of the panel fastener body 74*a* is colinear and coaxial with the aligned grooves 74*b'* and 128*d* of the locking element 128. As shown in FIGS. 11C and 11E, the lever 128*a'* remains oriented away from the panel fastener body 74 once the central protrusion 74*b* is inserted through the aperture 128*e* for easy access and manual actuation by the user.

Figure 10C:
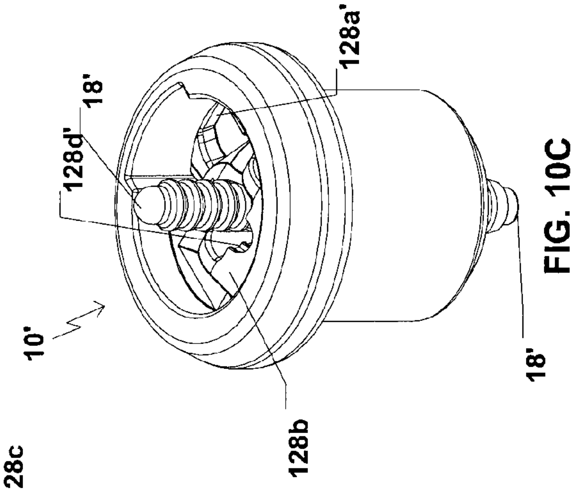
FIG. 10C shows a left rear perspective view of the fastener in the open and unlocked configuration with a removable stud inserted into the central aperture.
Figure 10B:
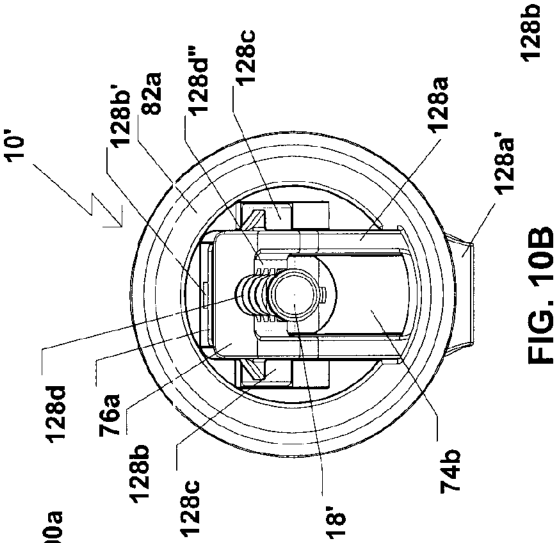
FIG. 10B shows a top plan view of the fastener in the open and unlocked configuration with a removable stud inserted into the central aperture.
Figure 10A:
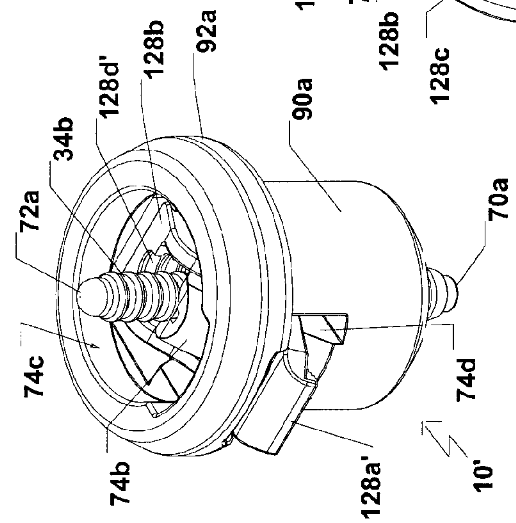
FIG. 10A shows a right perspective view of the fastener with the lever end of the hinged locking element actuated so as to be placed in the open and unlocked configuration with a removable stud inserted into the central aperture.

The manually-releasable leaf spring 76*a*, illustrated in FIGS. 13A-13D, is a metallic, preferably stainless steel, tension leaf spring 76*a* that is inserted into the slot-shaped aperture 88*b* passing through the planar second face 84*a* of the panel fastener body 74*a* and extends into the central recess 74*c* of said panel fastener body. The leaf spring 76*a* further includes a longer curved or angled end 76*c* and an aperture 76*b* for engaging said leaf spring with the hinged locking element 128. The longer angled end 76*c* of said leaf spring 76*a* provides spring tension to engage and hold the removable stud within grooves 74*b'* and 128*d* and within the central aperture 88*a* by pressing exerting tension force against the rear side 128*b*" of the hinged locking element 128. The retaining acclivity 128*b*' on the rear side 128*b*" of the hinged locking element 128 is positioned and shaped with an angle or slope to catch and retain said leaf spring 76*a* once the aperture 76*b* slides over and receives said retaining acclivity as shown in FIGS. 10B and 11A. Said leaf spring 76*a* is depressed by pushing upward on an actuating lever end 128*a*' of the hinged locking element 128 to decrease the tension exerted by said spring against the rear side 128*b*" of the hinged locking element 128. In the closed and locked configuration shown in FIGS. 11A-11F, the leaf spring 76*a* engages said removable stud 18' in a locking position configuration when not depressed or actuated by the user due to the tension of said spring against the hinged locking element 128 in the direction of the groove 74*b*' of the central protrusion 74*b* of said panel fastener body 74*a*. The tension of leaf spring 76*a* forces and holds the ridges 128*d*' of groove 128*d* of the hinged locking element 128 in position against the series of grooves 34*b* of the removable stud 18'. The tension force of said leaf spring 76*a* applied to the hinged locking element 128 also presses the removable stud 18' and the series of grooves 34*b* against the surface of groove 74*b*' of the central protrusion 74*b* of said panel fastener body 74*a*. As shown in FIGS. 10A-10C, which illustrate the open and unlocked configuration of the quick release fastener device 10', said leaf spring 76*a* releases the removable stud 18' when the actuating lever 128*a*' of the hinged locking element 128 is depressed or actuated by the user due to a relaxation of tension and removal of contact and mechanical interference between the ridges 128*d*' of the groove 128*d* of said locking element 128 and the grooves 34*b* of said removable stud.

FIG. 14 shows the spring-actuated panel fastener 20' engaging the removable stud 18' to secure a hurricane shutter 12 to the window sill of a structure.

The device 10 illustrated in FIGS. 1A-7 is used to remove a conventional hurricane shutter 12 so as to allow a person to escape from a building through a shuttered window, door, or other opening in the event of an emergency. The device 10 can also be used to secure plywood coverings 12 over windows and other openings of buildings. Said hurricane shutter escape mechanism 10 comprises a release member 14, an anchor 16, a removable stud 18, and a spring-actuated panel fastener 20. Where the use of the removable stud 18 and the spring-actuated panel fastener 20 are described, removable stud 18' and spring-actuated panel fastener 20' may be used in place of said stud 18 and said fastener 20.

The release member 14 comprises a somewhat flexible, planar metallic member 22 having a rounded first end 24 with an adjacent L-shaped handle 26 proximal to said first end 24 and a tapered second end 28 having an angled portion 30 and a two-pronged, stud-releasing slot 32 that is sized and shaped so as to engage an annular groove 34 of the removable stud 18. The angled portion 30 of the release member 14 separates said second end 28 of the release member, which engages the anchor 16 and removable stud 18 perpendicularly, from said first end 24 of the release member 14 so that said first end 24 is angled toward the opening in the structure to which said device 10 is attached. The L-shaped handle 26 is ergonomically designed to be manually pressed or pulled by a user.

Figure 1A:
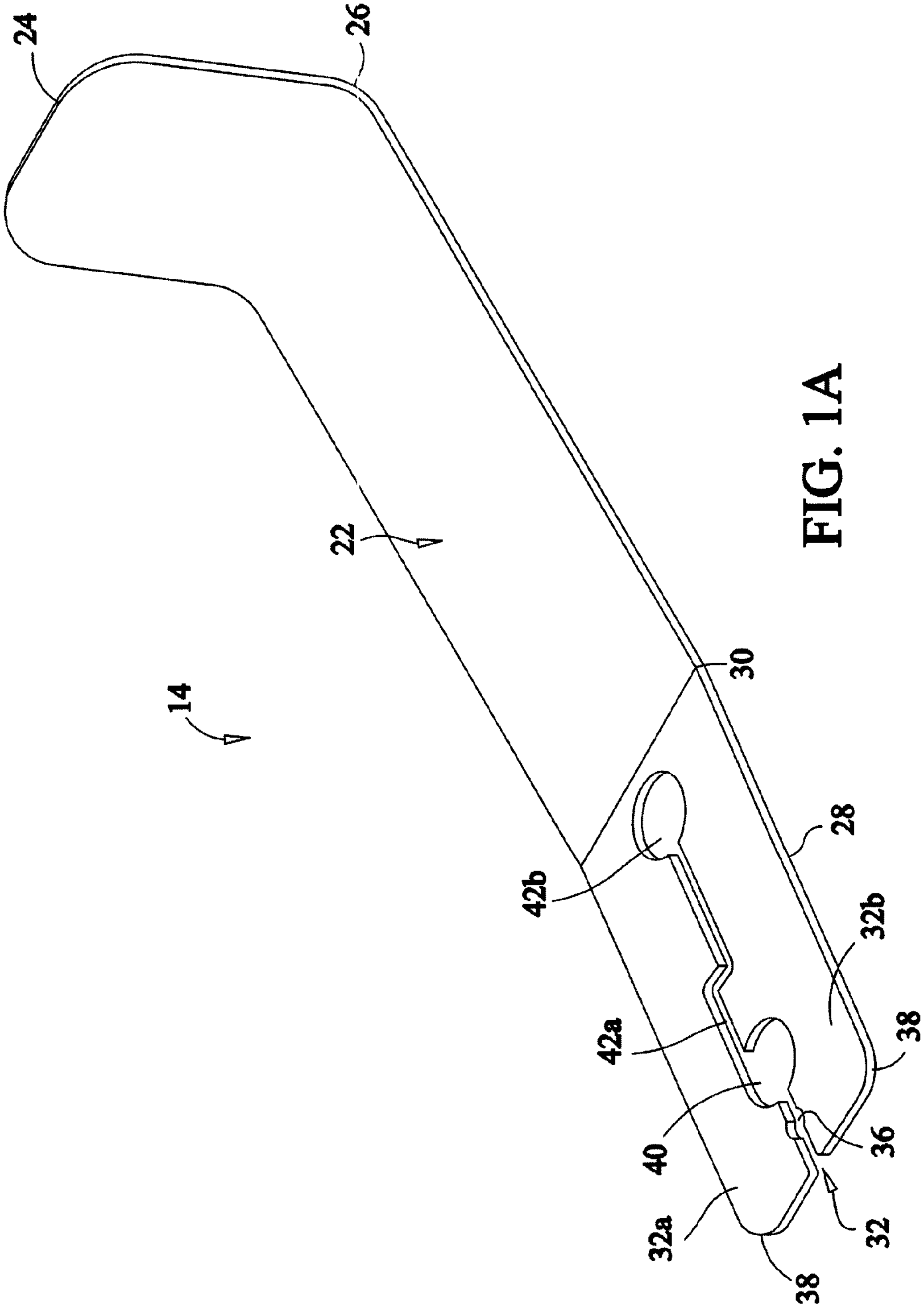
FIG. 1A shows a perspective frontal view of a release member of the hurricane shutter escape mechanism.
Figure 1B:
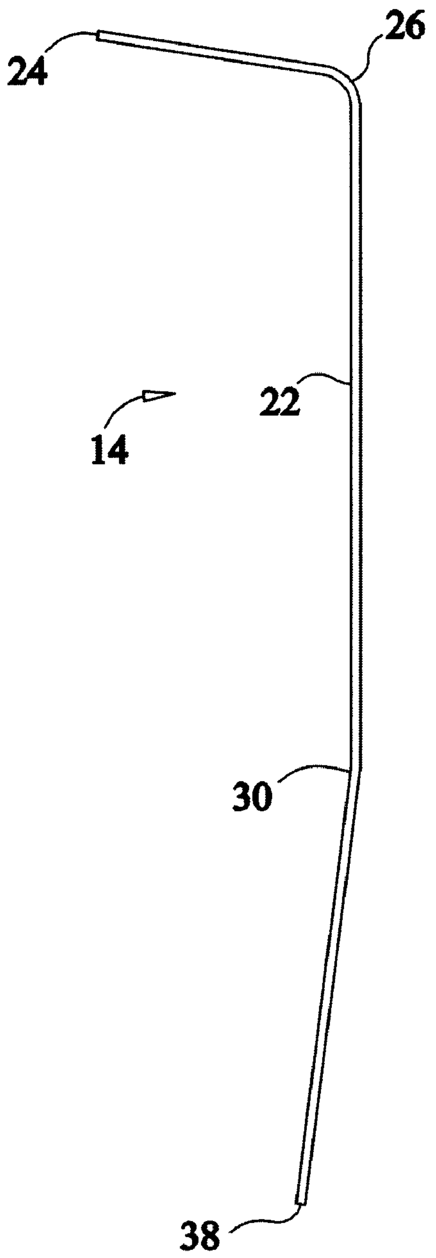
FIG. 1B shows an elevational right side view of the release member where the left side view of said release member is a mirror image of the illustration in FIG. 1B.
Figure 1C:
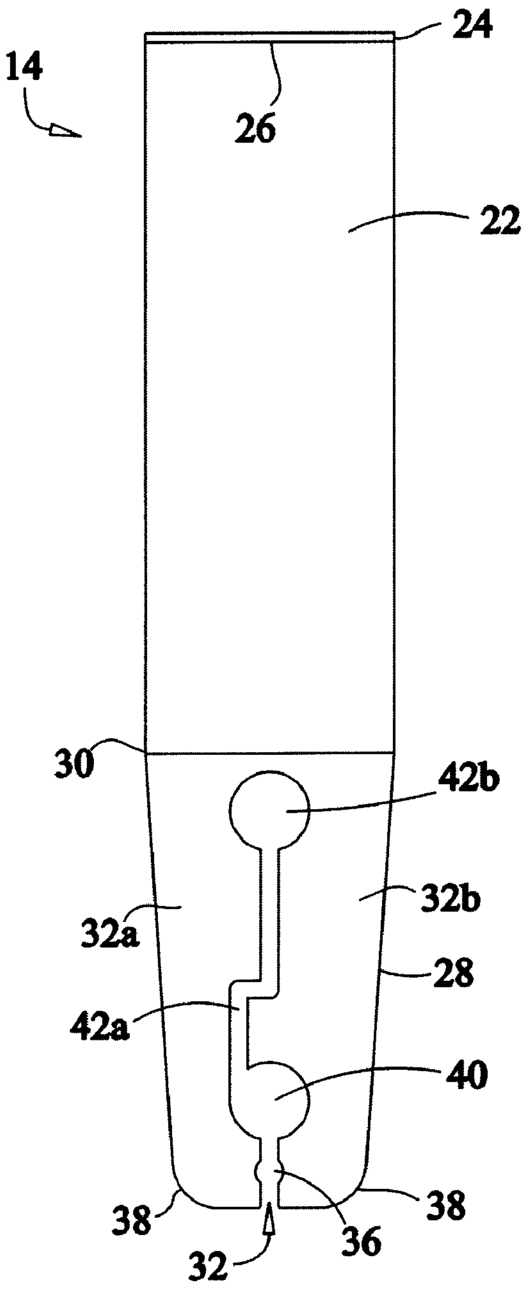
FIG. 1C shows a frontal side view of the release member where the left side view of said release member is a mirror image of the illustration in FIG. 1C.
Figure 2A:
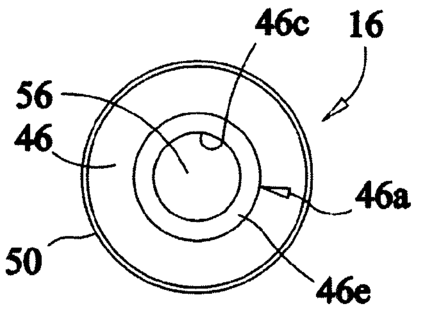
FIG. 2A shows a top view of an anchor of the hurricane shutter escape mechanism.
Figure 2B:
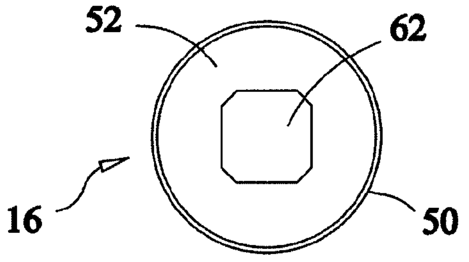
FIG. 2B shows a bottom view of the anchor.
Figure 2C:
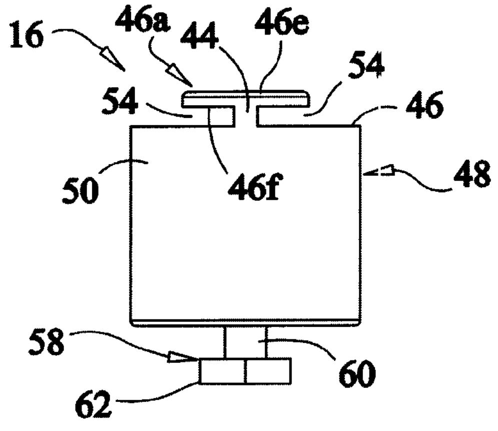
FIG. 2C shows an elevational front side view of the anchor where the back side view of said anchor is a mirror image of the illustration in FIG. 2C.
Figure 2D:
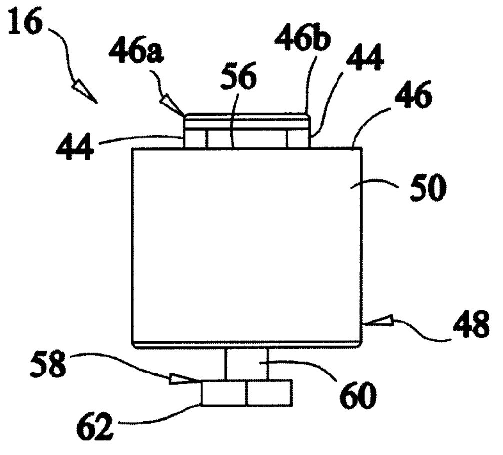
FIG. 2D shows an elevational left side view of the anchor rotated 90 degrees from the front side view in FIG. 2C where the right side view of said anchor is a mirror image of the illustration in FIG. 2D.
Figure 2E:
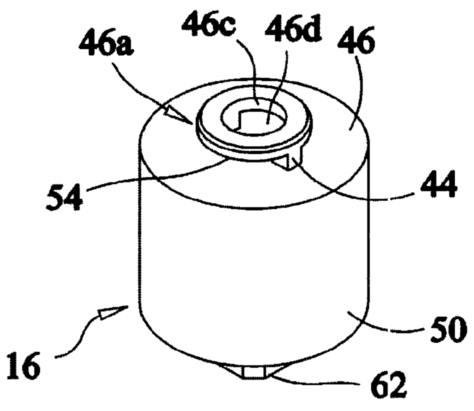
FIG. 2E shows a top perspective view of the anchor.
Figure 2F:
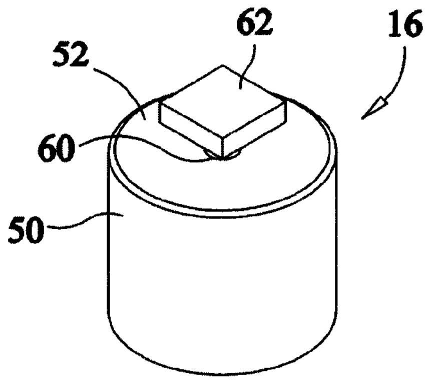
FIG. 2F shows a bottom perspective view of the anchor.

The stud-releasing slot 32 of the release member 14 includes a small recess aperture 36 that is located proximal to a tapered end tip 38 of the stud-releasing slot 32, and a large recess aperture 40 adjacent and connected to said small recess aperture 36 that when aligned with the removable stud 18 allows said removable stud to disengage from the anchor 16. Said large recess aperture 40 is preferably circular in shape. The large recess aperture 40 is sized so that, when the release member 14 is pushed down to unlock said release member such as during an emergency, the release member 14 can slide over and disengage from both removable stud 18 and a cylindrical protrusion 46*a* of a planar first end face 46 of the anchor 16. Said slot 32 of the release member 14 further includes preferably a narrow curved notch 42*a*, which is adjacent and connected to the large recess aperture 40, and which terminates in a large circular aperture 42*b* for providing resilient, spring-like action between two complementary prongs 32*a* and 32*b* forming said second end 28 and slot 32 of the release member. Thus, when the release member 14 is slidably engaged with the anchor 16 and the removable stud 18, prongs 32*a* and 32*b* flex apart slightly to receive the annular groove 34 of said stud 18 and return resiliently to a stable non-flexed configuration once the annular groove 34 of said removable stud 18 has passed into the small recess locking aperture 36. The slot 32 is also sized to receive two opposing metallic rectangular flanges 44 that support and connect the cylindrical protrusion 46*a* to the first end face 46 of said anchor 16. The flanges 44 are sized so as to freely pass into and out of the slot 32 without obstruction. The removable stud 18 can be moved between the recess aperture 36 and recess aperture 40 of said stud-releasing slot 32. The release member 14 is illustrated in FIGS. 1A through 1C.

Figure 5:
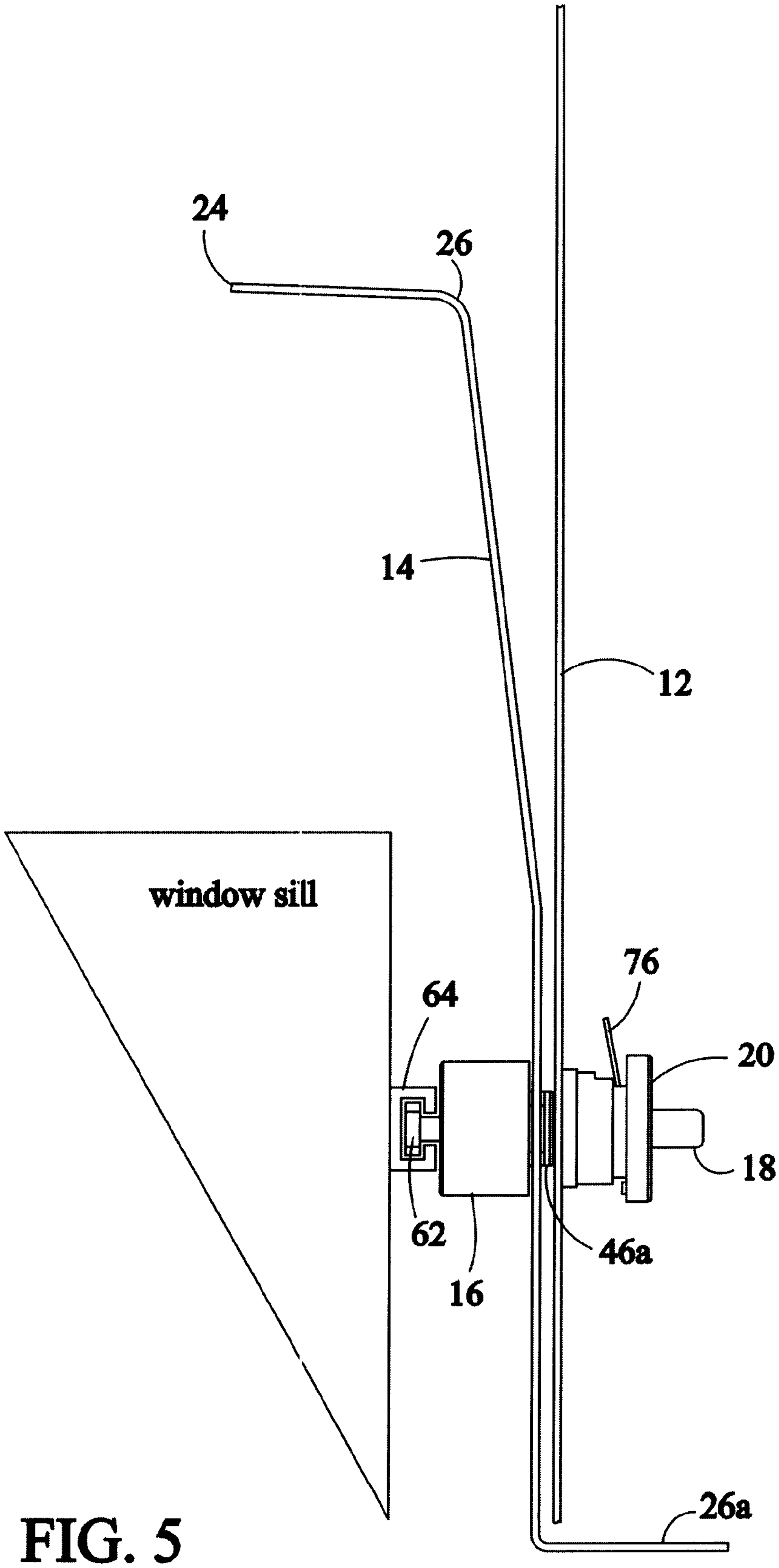
FIG. 5 shows a side elevational view of the hurricane shutter escape mechanism connected to a hurricane shutter panel and to a structure.
Figure 6:
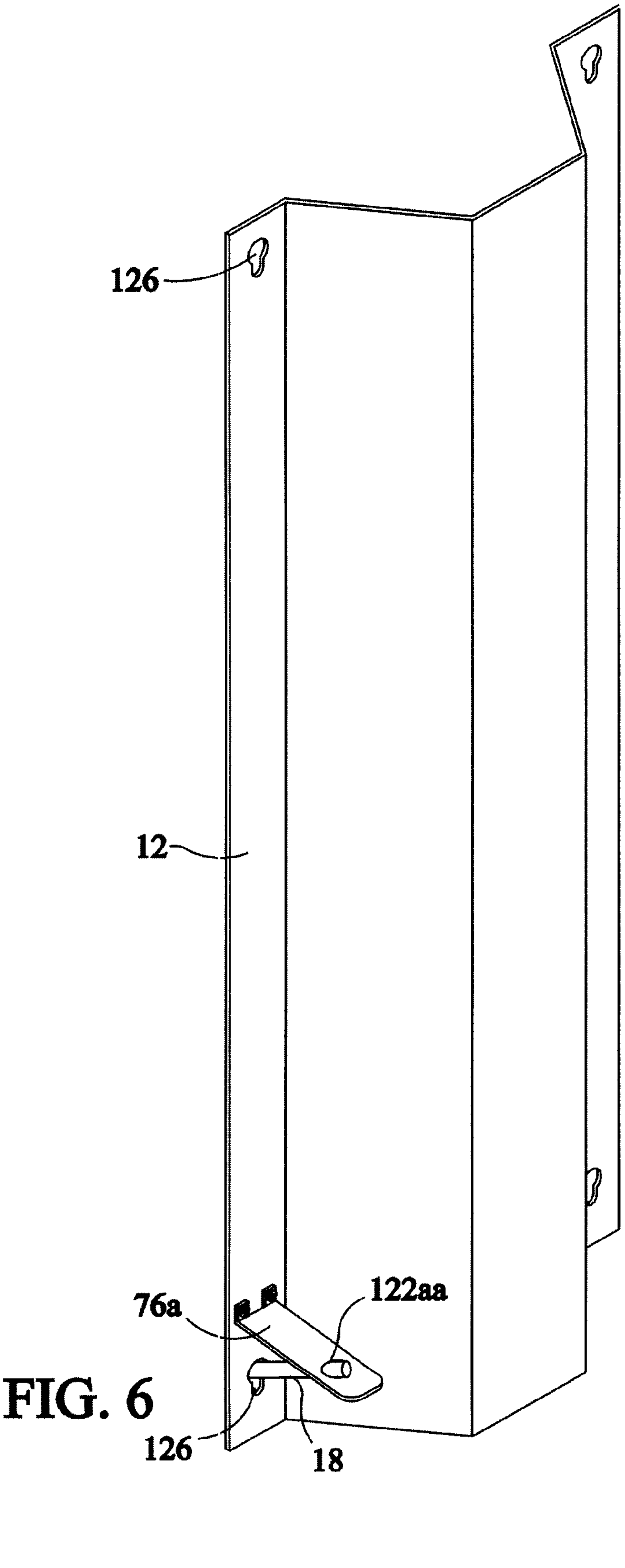
FIG. 6 shows a perspective view of a leaf spring attached directly to a hurricane shutter panel, said leaf spring being an escape mechanism that is accessible from both inside and outside of the building.
Figure 7:
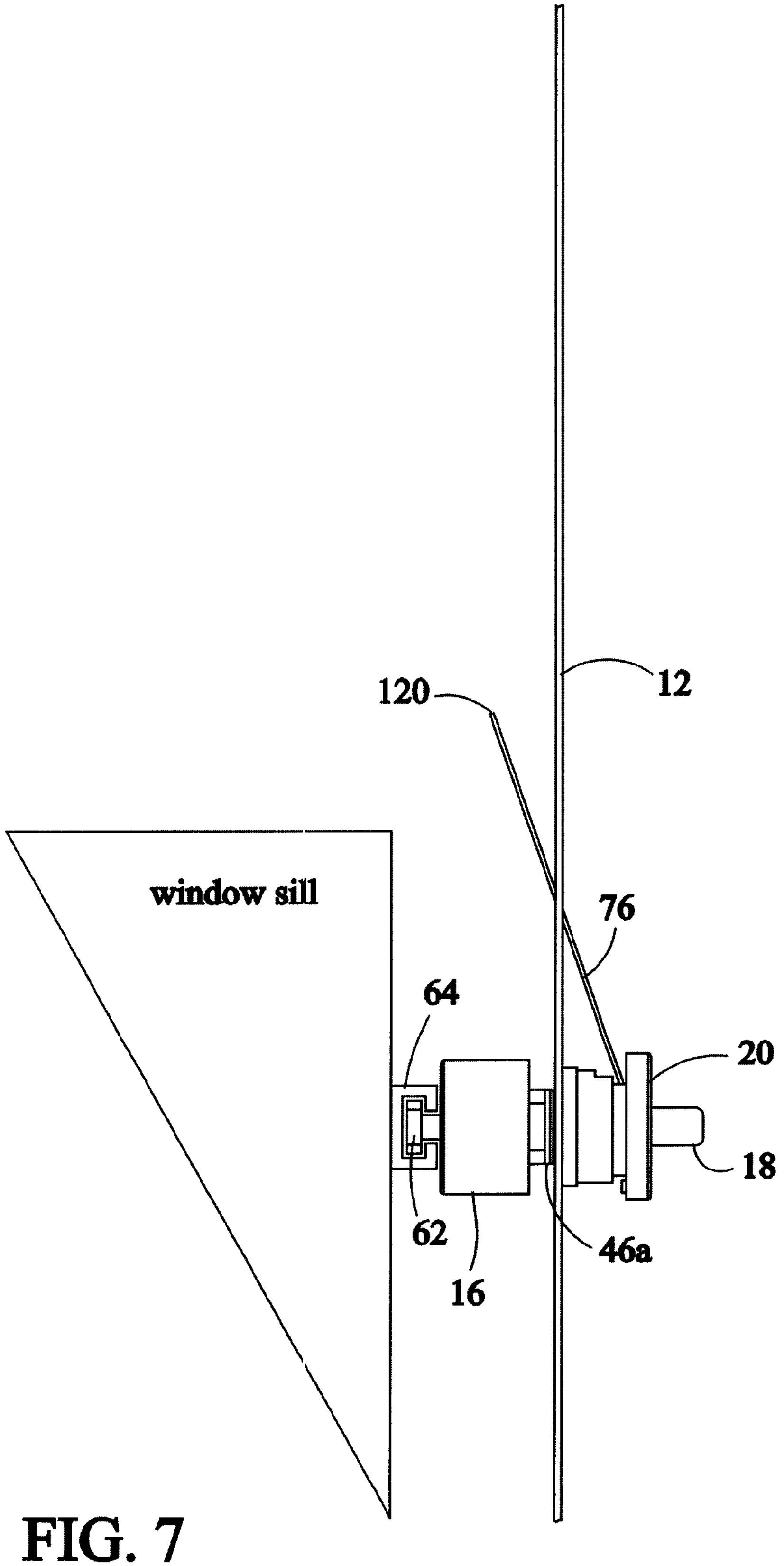
FIG. 7 shows an embodiment of the of the hurricane shutter escape mechanism in which a longer leaf spring is used as part of the spring-actuated panel fastener so that said leaf spring passes through an aperture through the hurricane shutter panel for accessibility as an escape mechanism to occupants inside the building.

In FIG. 5, an alternate embodiment of the release member 14 is illustrated in which a second L-shaped handle 26*a* is located adjacent to the second end 28 of said release member 14. In this embodiment, the stud-releasing slot 32 and all of said slot's related components are adapted to continue receiving the removable stud 18 while providing L-shaped handle 26*a* as a means for rescuers outside the building to quickly remove the hurricane shutter 12 from the window or opening that said shutter covers. To use handle 26*a* from outside the building, a rescuer must push downward manually on said handle 26*a* to force the removable stud 18 from small recess aperture 36 into large recess aperture 40. Once the removable stud 18 enters the large recess aperture 40, said release member 14 is unlocked from stud 18 and said stud 18 can slide through large recess aperture 40 and disengage from the hurricane shutter 12.

FIGS. 2A through 2F illustrate the anchor 16 of the shutter escape mechanism 10, which comprises a metallic cylindrical body 48 having a cylindrical outer wall 50, a planar first end face 46, a planar second end face 52, and the cylindrical protrusion 46*a* connected to first end face 46. The raised cylindrical protrusion 46*a* connected to said first end face 46 is separated from the main cylindrical body 48 and supported above the first end face 46 of the anchor 16 by the two opposing metallic rectangular flanges 44. Said cylindrical protrusion 46*a* includes a cylindrical outer wall 46*b*, a cylindrical inner wall 46*c* that surrounds a central aperture 46*d* of said cylindrical protrusion, a planar end face 46*e* including said central aperture for receiving said removable stud 18, and a bottom annular face 46*f* to which said flanges connect to attach said cylindrical protrusion 46*a* to said first end face 46 of the anchor 16. The central aperture 46*d* passes through the cylindrical protrusion 46*a* and is aligned with a central aperture 56 of the cylindrical body 48 of said anchor 16. Two mirror-image, release member retaining grooves 54 are positioned equidistantly apart on and through the outer cylindrical wall 46*b* of said cylindrical protrusion 46*a* where said outer wall 46*b* meets the first end face 46 of the anchor 16. Preferably, each of the rectangular flanges 44 extends from the inner wall 46*c* to the outer wall 46*b* of said cylindrical protrusion 46*a* on each flange's respective side of said protrusion 46*a*, however flanges of alternative positions, shapes, and sizes also may be used effectively. Preferably, the diameter of the cylindrical protrusion 46*a* is approximately one-half of the diameter of the first end face 46 of the cylindrical body 48.

The first end face 46 of said anchor 16 has a central aperture 56 that preferably extends through approximately one-third to one-half of the depth of said cylindrical body 48. The central aperture 56 of the cylindrical body 48 and the central aperture 46*d* that extends through the cylindrical protrusion 46*a* are aligned so as to receive insertion of removable stud 18. The second end face 52 of the anchor 16 has a necked flange 58 comprised of a small, preferably cylindrical, shaft 60 centrally positioned on the second end face 52 and a slidable plate 62 connected to a distal end of said cylindrical shaft 60. Said slidable plate 62 is preferably square or rectangular in shape, although other shapes may also be employed. The slidable plate 62 is engaged with a bracket 64 shaped for receiving a slidable plate and either temporarily or permanently affixed to the home or building. The necked flange 58 and slidable plate are the preferred means for securing the anchor 16 to a building, however, other connecting means may be used to attach said anchor to existing hardware that is already connected to the exterior of said building.

In another embodiment of the device, a wall of the central aperture 56, which passes entirely through the cylindrical body 48 of said anchor 16 in this embodiment, is threaded so that said anchor 16 can be fitted over and screwed onto a threaded stud that is preinstalled on the exterior wall of the building. This allows said anchor 16 to be secured to the building where a permanently or removably affixed stud is installed on an exterior wall or other surface of the building rather than a bracket 64 shaped for receiving a slidable plate. In this embodiment, the anchor 16 does not include the necked flange 58 and slidable plate 62 attached to the second end face 52 of said anchor 16.

Figure 3A:
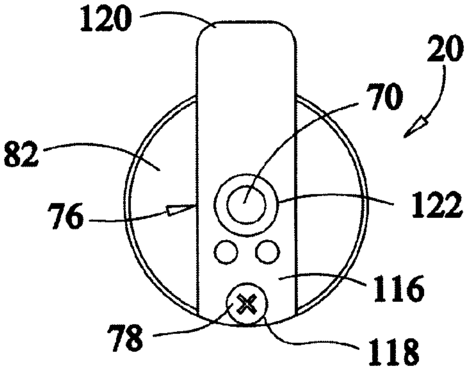
FIG. 3A shows a top view of a spring-actuated panel fastener of the hurricane shutter escape mechanism with a leaf spring attached and engaging a removable stud.
Figure 3B:
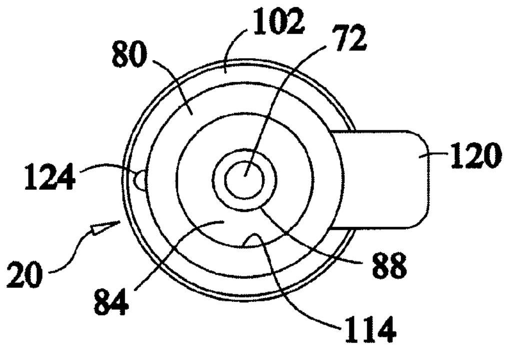
FIG. 3B shows a bottom view of the spring-actuated panel fastener.
Figure 3C:
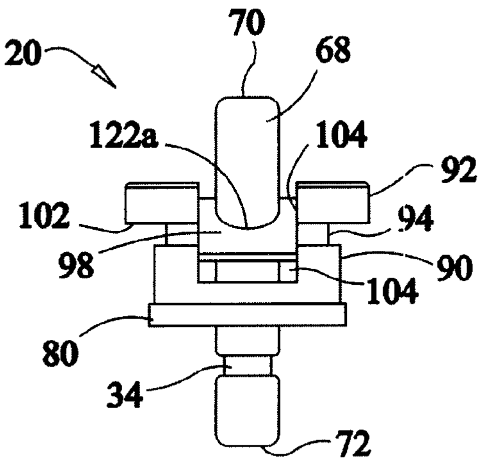
FIG. 3C shows an elevational front side view of the spring-actuated panel fastener.
Figure 3D:
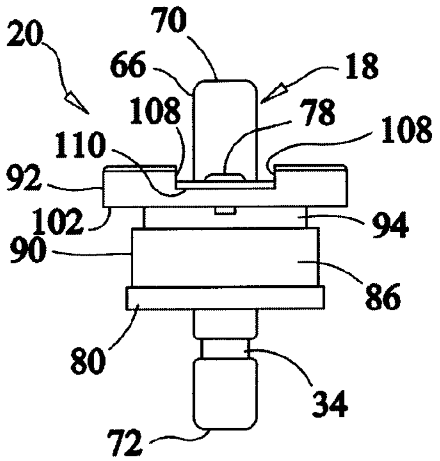
FIG. 3D shows an elevational back side view of the spring-actuated panel fastener.
Figure 3E:
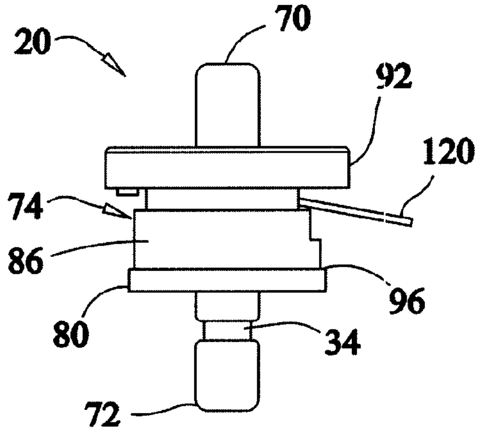
FIG. 3E shows an elevational left side view of the spring-actuated panel fastener rotated 90 degrees from the front view in FIG. 3D where the right side view of said spring-actuated panel fastener is a mirror image of the illustration in FIG. 3E.
Figure 3F:
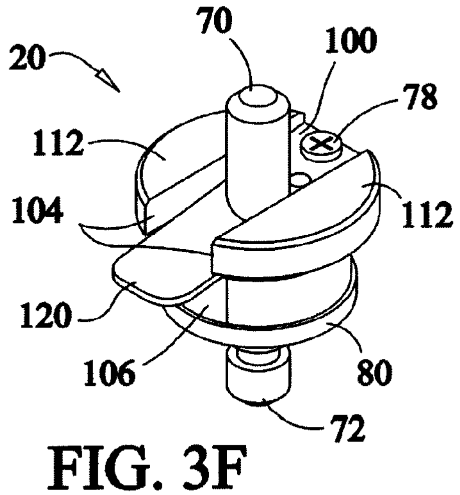
FIG. 3F shows a perspective view of the spring-actuated panel fastener.
Figure 4A:
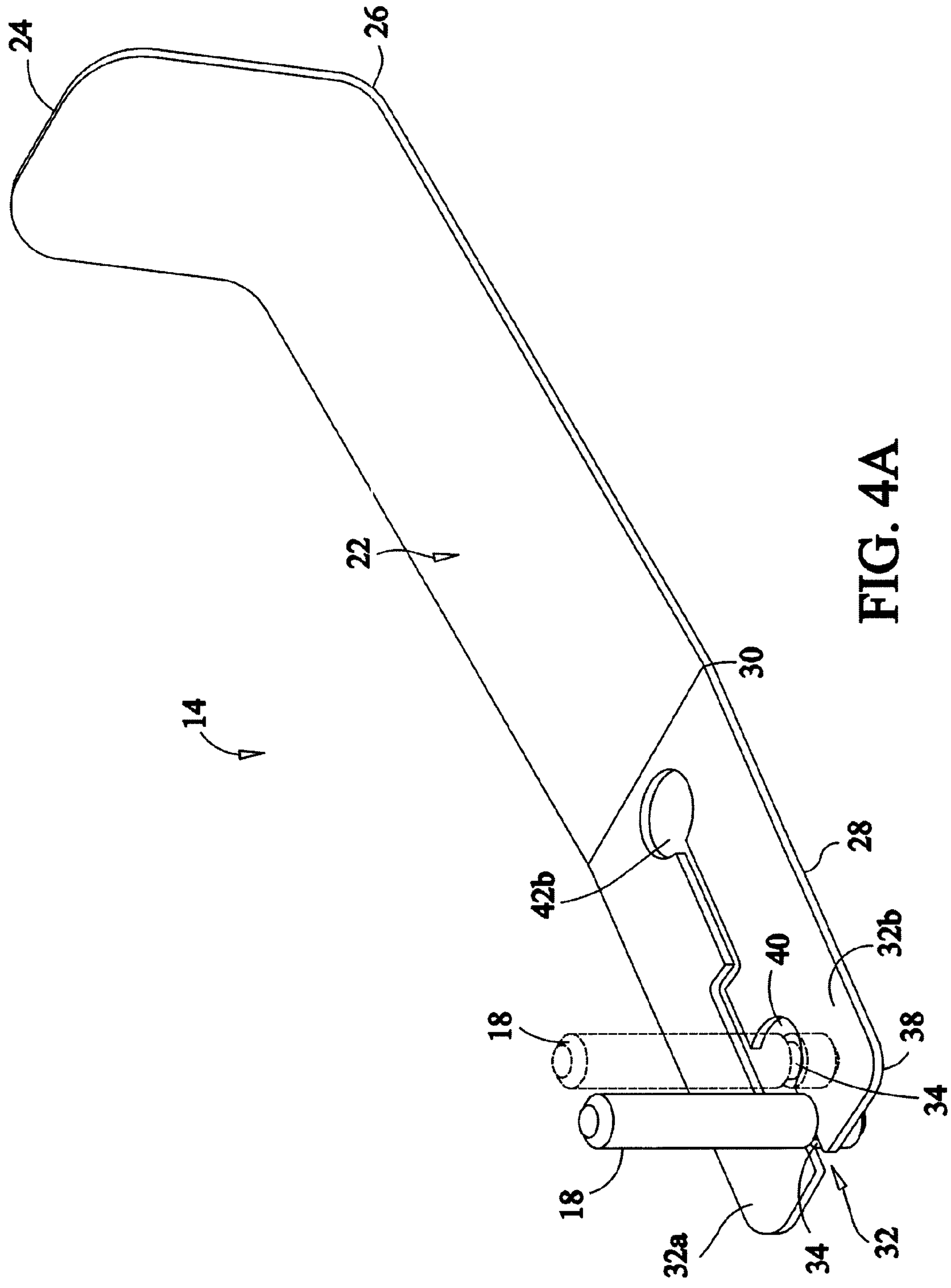
FIG. 4A shows a perspective view of a stud of the hurricane shutter escape mechanism locked in a small recess aperture of a release member as well as a phantom view of a stud positioned inside a large recess aperture of said release member.
Figure 4B:
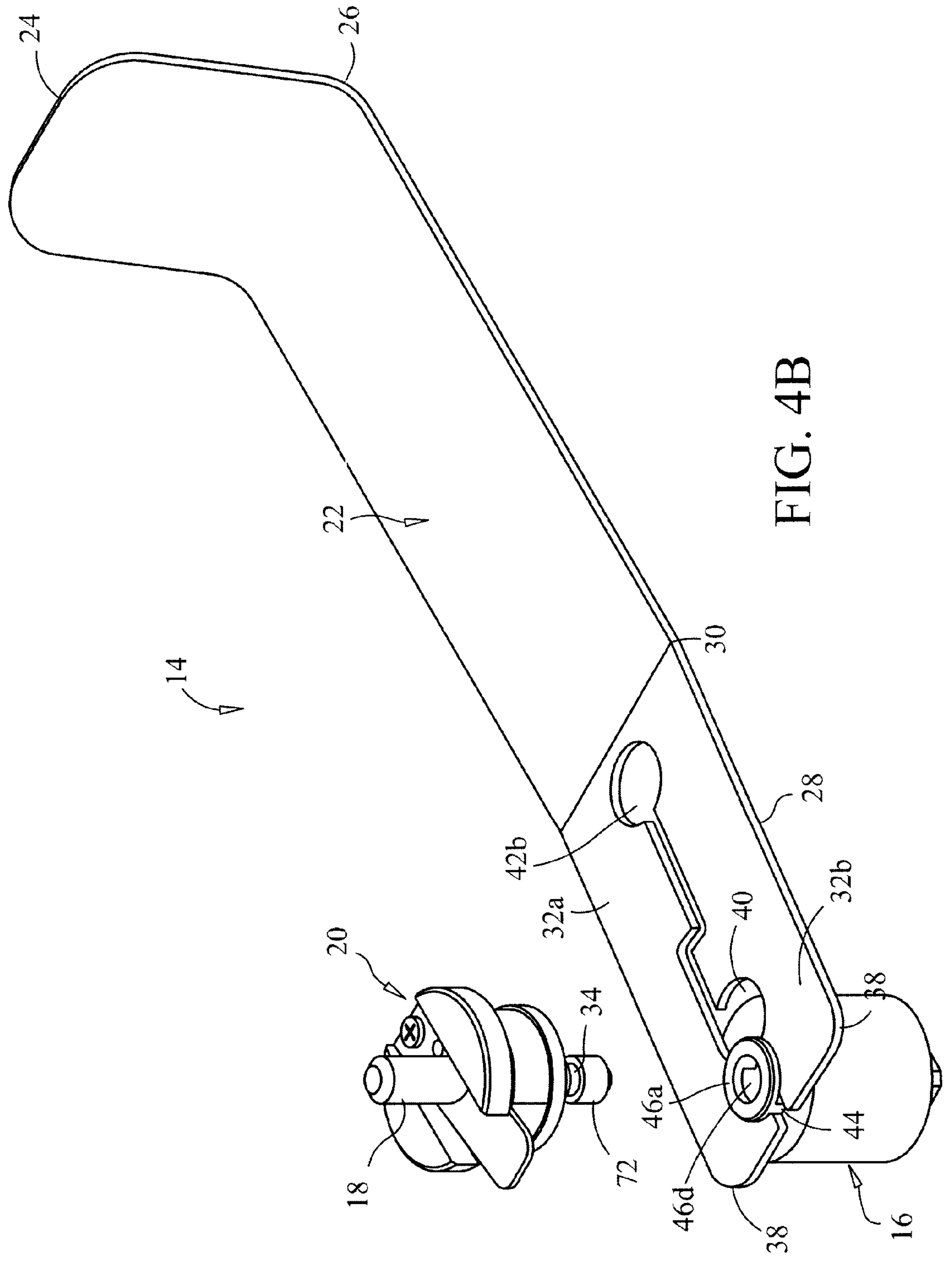
FIG. 4B shows a perspective view of the hurricane shutter escape mechanism engaged with a stud but not engaging a hurricane shutter panel and with an anchor inserted into the stud-receiving slot of a release member.

FIGS. 3A-3F, 4A-4B, and 5-7 illustrate alternate embodiments 18 and 20 of the removable stud 18' and fastener 20'. As shown in FIGS. 3C and 3F, the removable stud 18 of said escape mechanism 10 comprises a metal dowel 66 having a cylindrical outer wall 68, a rounded first end 70, a rounded second end 72, and an annular groove 34 adjacent to said first end 70 for engaging the stud-releasing slot 32 of the release member 14. In an alternate embodiment, the second end 72 of said stud 18 may be threaded for engaging a wingnut to secure the shutter panel 12 to a building. FIG. 4A illustrates the stud 18 inserted through the small recess aperture 36 of the release member 14 and a phantom view of said stud inserted through the large recess aperture 40 of said release member. FIG. 4B shows an exploded view of the stud 18 engaged with the spring-actuated panel fastener 20 and the cylindrical protrusion 46*a* of anchor 16 positioned in the small recess aperture 36 of said release member 14. The removable stud 18 may include numerous annular grooves (not shown in the drawings) on the cylindrical outer wall 68 of said stud 18.

The spring-actuated panel fastener 20, illustrated in FIGS. 3A through 3F, comprises a panel fastener body 74, a manually-releasable leaf spring 76, a rivet 78 for attaching said leaf spring 76 to said panel fastener body 74, and a washer 80 attached to the panel fastener body 74. Said spring-actuated panel fastener 20 serves to engage the removable stud 18 at a surface of the hurricane shutter 12 on a side opposite that of the anchor 16 to secure said shutter within the hurricane shutter escape mechanism 10 so that said shutter is mounted firmly in position over an opening in a structure. The panel fastener body 74 of said spring-actuated panel fastener 20 includes a planar first face 82, a planar second face 84, a cylindrical outer wall 86, and a central aperture 88 for receiving the removable stud 18. Said panel fastener body 74 further comprises a cylindrical base portion 90 that includes said second face 84 and said outer cylindrical wall 86. Said panel fastener body 74 also includes a cylindrical top portion 92 that has a greater diameter than said cylindrical base 90 and that includes said first face 82.

The panel fastener body 74 further includes a first annular groove 94 and a second annular groove 96 as well as a first recess 98 and a second recess 100. The first annular groove 94 is cut into the cylindrical wall 86 of said panel fastener body 74 so that said groove 94 is located adjacent to a bottom face 102 of the cylindrical top portion 92 of the panel fastener body. Thus, the first annular groove 94 separates said cylindrical base portion 90 from said cylindrical top portion 92 of the panel fastener body 74. The second annular groove 96 is cut around the cylindrical wall 86 of said cylindrical base 90 adjacent to said second face 84 so that said second face 84 has a diameter that is smaller than the diameter of the cylindrical base 90.

The first recess 98 of the panel fastener body 74 has three flat walls 104 and a planar bottom surface 106 and is cut from the panel fastener body 74 across approximately four-fifths of the width and through three-fourths of the depth of said panel fastener body 74. Moreover, the first recess 98 is cut out from both the cylindrical top portion 92 and the cylindrical base 90 of the panel fastener body 74 as shown in FIGS. 3A, 3C, and 3F. Said second recess 100 of the panel fastener body 74 is shallow having two opposing flat walls 108 and a planar bottom surface 110 and being cut out from one-half the depth of said cylindrical top portion 92 through said first face 82. The planar bottom surface 110 of said second recess 100 further includes a threaded, circular aperture 124, which penetrates the cylindrical top portion 92, for receiving a rivet 78 or screw 78 that is inserted into said aperture 124 to attach the leaf spring 76 to said panel fastener body 74. The central aperture 124 penetrates both the first face 82 and the planar bottom surface 110 of the second recess 100 of the panel fastener body 74. The first and second recesses 98, 100 are connected to one another and have identical widths so that said cylindrical top portion 92 is bisected into two complementary, partially hemispherical halves 112.

As illustrated in FIGS. 3A through 3F, the leaf spring 76 of the spring-actuated panel fastener 20 is comprised of a metallic tension leaf spring 76 having a width that is slightly less than the width of said first recess 98 and said second recess 100 of the panel fastener body 74 so that said leaf spring 76 may be set into said first and said second recesses 98, 100 and connected to said panel fastener body 74 on the planar bottom surface 110 of the shallow second recess 100. Said metallic leaf spring 76 is constructed preferably from stainless steel. Said spring 76 includes a short, horizontally planar end 116 of sufficient length to fit smoothly and precisely into the shallow second recess 100 of said panel fastener body 74. A circular aperture 118, which penetrates said planar end 116 of the spring 76, is sized to receive the rivet 78 or screw 78, which attaches said leaf spring 76 to said panel fastener body 74. Said leaf spring 76 also has a longer angled end 120 for providing spring tension to engage and hold the removable stud 18. The angled end 120 of said leaf spring 76 includes a locking aperture 122 having a diameter great enough to precisely fit and receive the removable stud 18 that is inserted therethrough to secure a hurricane shutter 12 to the building to be protected, said locking aperture 122 being aligned with the central aperture 88 of the panel fastener body 74. Preferably, said leaf spring 76 has a length that is greater than the width of the cylindrical top portion 92 of the panel fastener body 74 to allow easy handling by the user. Therefore, said angled end 120 preferably extends beyond the diameter of the cylindrical top portion 92 of the panel fastener body 74.

The leaf spring 76 is attached to the panel fastener body 74 by means of a rivet 78 or screw 78 that is inserted into the circular aperture 118 located on the horizontally planar end 116 of the spring 76. The aperture 118 on the planar end 116 of the spring 76 is aligned with the threaded, circular aperture 124 of the panel fastener body 74 so that the rivet 78 or screw 78 can be inserted through the aligned apertures 118 and 124 for attaching said leaf spring 76 to said panel fastener body 74.

The longer angled end 120 of said leaf spring 76 can be held and pushed upward by the user to decrease the tension exerted by said spring 76 on the outer cylindrical wall 68 of the removable stud 18. By placing force on the leaf spring 76, the angle at which an inner wall 122*a* of the locking aperture 122 of said leaf spring 76 contacts the cylindrical wall 68 of removable stud 18 is altered. Therefore, the relative diameter of the locking aperture 122 is changed in relation to fixed position of the removable stud 18 while said stud is engaged by release member 14. At rest, the locking aperture wall 122*a* of said leaf spring 76 contacts the removable stud 18 and prevents said removable stud 18 from being released from the shutter escape mechanism 10 due to the tension exerted by the spring 76 against said removable stud 18. The leaf spring 76 engages said removable stud 18 in a locking configuration when not being depressed by the user due to the angle at which the locking aperture wall 122*a* of said spring 76 contacts the cylindrical wall 68 of said removable stud 18. Where a removable stud 18 having annular grooves on the cylindrical outer wall 68 is used, said locking aperture wall 122*a* of said leaf spring 76 contacts said stud 18 within one of the grooves, thereby providing a stronger, more effective locking effect on said removable stud. FIG. 3F illustrates a removable stud 18 inserted through a central aperture 88 of a panel fastener body 74. Said leaf spring 76 releases said removable stud 18 when pushed or pulled upward against the angle of the angled end 120 of said spring 76 due to a relaxation from contact by the removable stud 18 with the aperture wall 122*a* of said spring 76.

The circular, annular washer 80 of the spring-actuated panel fastener 20 has approximately the same diameter as the cylindrical base 90 of the panel fastener body 74 and includes a central aperture 114 that is inserted over and around the second annular groove 96 of said panel fastener body 74 so that said washer 80 is nearly flush with the planar second face 84 and outer cylindrical wall 86 of said panel fastener body 74. Preferably, said washer 80 is constructed from rubber or another elastomer material.

The shutter release mechanism 10 can be used to secure standard hurricane/storm shutters and panels as well as plywood coverings over the openings on the exterior of a building. Additionally, the device 10 can be adapted for operability with various commercial designs for brackets and other shutter and panel attachments connected to the exterior of a building or home.

Any of the parts described herein as being metallic or constructed from metal may also be made from plastic, polymers, or any other suitable rigid or semi-rigid material as required by the function of the particular component part. Additionally, where certain parts are described as being cylindrical in shape, said parts may also be prismatic and/or polygonal, elliptical, or any other suitable shape in cross-section.

Using the device 10, hurricane shutters 12 can be quickly and easily released to allow the escape of occupants from a building in the event of an emergency, such as a fire. FIG. 5 illustrates the shutter release mechanism 10 connected to a building and to a hurricane shutter 12 while in operation. The anchor 16 is attached to an exterior wall or to a window sill of the structure to be secured by the hurricane shutters 12, and the first end 70 of removable stud 18 is inserted into two aligned central apertures 46*d* and 56 of said anchor. Once inserted into the central apertures 46*d* and 56 of said anchor 16, the annular groove 34 of said stud 18 is horizontally aligned with the two grooves 54 cut through the outer cylindrical wall 46*b* of cylindrical protrusion 46*a* that is centrally positioned on first end face 46 of said anchor 16. Central aperture 46*d* passes through the cylindrical protrusion 46*a*.

Next, a release member 14 is engaged with said anchor 16 by inserting prongs 32*a* and 32*b*, which form a stud-releasing slot 32 of said release member 14, into the grooves 54 of said anchor 16. By pressing firmly downward on the release member 14, the two-pronged second end 28 of said release member flexes apart slightly to receive and lock in position the annular groove 34 of stud 18 in the small recess aperture 36 located on said second end 28 of said release member.

An aperture 126 through the hurricane shutter panel 12 is mounted over the second end 72 of stud 18 to engage said shutter panel with the structure to be protected. Then, the hurricane shutter panel 12 is firmly secured to the structure and to the shutter release mechanism 10 by slidably engaging the spring-actuated panel fastener 20 over said second end 72 of stud 18. The central aperture 88 of said spring-actuated panel fastener 20 is positioned in alignment with stud 18 so that aperture 88 of said fastener 20 can be inserted over the second end 72 of said stud 18. The second face 84 of said fastener 20, through which central aperture 88 passes, is positioned to slidably engage stud 18 and to contact the hurricane shutter panel 12 on a surface of said shutter that is opposite but adjacent to the surface of said shutter panel that is in contact with end face 46*e* of the cylindrical protrusion 46*a* of said anchor 16. Physical contact between a wall 122*a* of the locking aperture 122 of leaf spring 76 and the outer cylindrical wall 68 of stud 18 provides spring tension to lock and hold said stud 18 in first locking position, thereby firmly securing the fastener 20 in position on stud 18 as well as securing the hurricane shutter panel 12 to the structure.

In the event of an emergency, an occupant of the structure preferably will press downward on the L-shaped handle 24 of the release member 14 to unlock said release member 14 from the removable stud 18. By pressing down on the release member 14, slot 32 of said release member is shifted downward in position so that the small recess aperture 36 passes over stud 18 and the large recess aperture 40 of slot 32 receives stud 18 and the cylindrical protrusion 46*a* of the anchor 16. The large recess unlocking aperture 40 is sufficiently large to pass freely over the diameter of said cylindrical protrusion 46*a* so that the release member 14, stud 18, fastener 20, and the hurricane shutter panel 12 can be cast off without any obstruction, thereby permitting the occupants of the structure to escape through the shutter-protected opening. Once the hurricane shutter 12 is removed from the opening of the structure, the occupants of said structure can easily escape to safety.

The shutter release mechanism 10 also allows hurricane shutters 12 to be quickly removed from a building to obtain access for rescue of the occupants of the shutter-protected building during an emergency. To obtain access to the interior of a building through a shutter-protected opening, a rescuer must depress the leaf spring 76 from the exterior of the structure so that the physical contact between inner wall 122*a* of the locking aperture 122 of said leaf spring 76 and the outer cylindrical wall 68 of stud 18 is removed. By depressing the leaf spring 76, the angle at which the locking aperture wall 122*a* is positioned in relation to the perpendicularly-oriented stud 18 is altered to decrease or eliminate the spring tension used to lock and hold said stud 18 in the secure position. When the contact and spring tension are reduced or eliminated, a rescuer can easily remove fastener 20 and hurricane shutter panel 12 from the opening of the structure, thereby allowing rescue of the building's occupants.

The instant invention has been shown and described herein in what is considered to be the most practical and preferred embodiment. The applicants recognize, however, that departures may be made therefrom within the scope of the invention and that obvious modifications will occur to a person skilled in the art.

What is claimed is:

1. A quick release fastener device for quickly installing and securing and for releasing and removing a temporarily-installed hurricane shutter panel from a window or door over which said shutter is installed, comprising:

a stud having at least one end that is connectable to a building structure to hold a hurricane storm shutter in place over a window, door, or other opening of the structure; and a spring-actuated panel fastener removably connected to an end of said stud oriented away from the structure for holding said hurricane shutter in place, said fastener including a panel fastener body, a hinged locking element, and a spring for manually installing and removing said fastener on and from said stud;

wherein the spring-actuated panel fastener comprises:

the spring, which comprises a leaf spring;

the panel fastener body that includes:

a planar first face;

a central recess passing through said planar first face and extending longitudinally downward into said panel fastener body, said central recess being defined by one or more inner walls and a planar bottom surface of the panel fastener body;

a planar second face;

an outer wall; and a central aperture for receiving the removable stud that extends entirely through the said panel fastener body with openings on both the first face and the second face of the panel fastener body;

a slot-shaped aperture extending longitudinally through the planar second face and into the central recess of said panel fastener body for receiving the leaf spring; and a central protrusion having a groove that is coaxial and colinear with the central aperture, said central protrusion being connected to and extending upward from the planar bottom surface defining the central recess; and a hinged locking element having a groove that is opposite and corresponding in position and identical in size to the groove of said central protrusion, wherein said locking element is connected to the panel fastener body and securely engages the removable stud within said groove of the locking element when said fastener is not actuated.

2. The quick release fastener device of claim 1, wherein said stud is a removable stud comprising a dowel having:

an outer wall;

a first end for engaging the panel fastener body and hinged locking element;

a second end for connecting to the building structure and for inserting through a stud-receiving installation aperture of the shutter; and a series of annular grooves adjacent to said second end for engaging the fastener.

3. The quick release fastener device of claim 1, wherein said panel fastener body further comprises:

a base portion that includes said second face and said outer wall;

a top portion that has a greater diameter than said base and that includes said first face and a partial annular bottom face;

said panel fastener body also including a side aperture opening into the central recess for receiving insertion and installation of the hinged locking element; and said panel fastener body further including means for securely engaging the hinged locking element to retain said locking element within the central recess and to maintain alignment between the groove of the locking element and the groove of the central protrusion, thereby extending the central aperture with which said grooves are colinear and coaxial.

4. The quick release fastener device of claim 3, wherein the means for securely engaging the hinged locking element comprises two circular recesses located on opposing sides of the inner wall defining the central recess;

wherein said recesses each receive one end of one or more fulcrum components of the hinged locking element that are rotatable within said recesses to allow pivoting of a lever and of a vertical engaging section that includes the groove of said locking element.

5. The quick release fastener device of claim 3, wherein said hinged locking element further comprises:

an actuating lever for manual manipulation to open the panel fastener body and release the removable stud;

a series of ridges located within the groove of said locking element and sized and spaced to engage the series of ridges of the removable stud to lock and retain said stud in position; and means for engaging the leaf spring, wherein said leaf spring provides the tension to maintain said hinged locking element in the closed, locked position with respect to the central protrusion thereby securely engaging and holding the removable stud within the central aperture of the panel fastener body and between the grooves of the central protrusion and the locking element.

6. The quick release fastener device of claim 1, wherein the leaf spring includes:

a metallic, preferably stainless steel, tension leaf spring that is inserted into the slot-shaped aperture passing through the planar second face of the panel fastener body and extends into the central recess of said panel fastener body; and an aperture for engaging said leaf spring with the hinged locking element;

wherein said leaf spring also includes a longer angled end for providing spring tension to engage and hold the removable stud; and wherein said leaf spring is depressed by actuating an actuating lever of the hinged locking element to decrease the tension exerted by said spring on the hinged locking element that forces said locking element against the groove of the central aperture.

7. The quick release fastener device of claim 6, wherein the leaf spring engages said removable stud in a locking position configuration when not depressed due to the tension of said spring against the hinged locking element in the direction of the groove of the central protrusion of said panel fastener body and wherein said leaf spring releases said removable stud when the actuating lever of the hinged locking element is depressed due to a relaxation of tension and contact by the ridges of the groove of said locking element with the surface of the grooves of the removable stud.

* * * * *